US012570243B1

(12) United States Patent
Lockwood et al.

(10) Patent No.: US 12,570,243 B1
(45) Date of Patent: Mar. 10, 2026

(54) TRAILER WASHDOWN APPARATUS

(71) Applicants: Aaron Philip Lockwood, Clearwater, FL (US); Jennifer Danelle Lockwood, Clearwater, FL (US)

(72) Inventors: Aaron Philip Lockwood, Clearwater, FL (US); Jennifer Danelle Lockwood, Clearwater, FL (US)

( * ) Notice: Subject to any disclaimer, the term of this patent is extended or adjusted under 35 U.S.C. 154(b) by 300 days.

(21) Appl. No.: 18/137,904

(22) Filed: Apr. 21, 2023

Related U.S. Application Data

(60) Provisional application No. 63/363,340, filed on Apr. 21, 2022.

(51) Int. Cl.
| | |
|---|---|
| B60S 1/66 | (2006.01) |
| B08B 3/02 | (2006.01) |
| *B60P 3/10* | (2006.01) |
| *B60R 16/033* | (2006.01) |

(52) U.S. Cl.
CPC .................. B60S 1/66 (2013.01); B08B 3/02 (2013.01); *B08B 2203/027* (2013.01); *B60P 3/1033* (2013.01); *B60R 16/033* (2013.01)

(58) Field of Classification Search
None
See application file for complete search history.

(56) References Cited

U.S. PATENT DOCUMENTS

| | | | |
|---|---|---|---|
| 2008/0018077 A1* | 1/2008 | Preece | B60P 3/1033 |
| | | | 280/414.1 |
| 2019/0322246 A1* | 10/2019 | Sarne | B60S 1/68 |

* cited by examiner

*Primary Examiner* — Cristi J Tate-Sims
(74) *Attorney, Agent, or Firm* — John A. Yirga, Esq; Watts Law LLC

(57) ABSTRACT

A trailer washdown apparatus is disclosed. The trailer washdown apparatus has a tank comprising inner and outer walls with an inlet for fluid intake and an outlet for fluid egress, a pump removably coupled to the outlet of the tank for pressurizing the fluid with a pump outlet for egress of pressurized fluid, a power source, and a fluid distribution system coupled to the outlet of the pump, the fluid distribution system having a plurality of flexible fluid transport passageways, the plurality fluid transport passageways having first and second ends. The first ends are coupled to the pump outlet and the second ends are coupled to a plurality of nozzles, and the plurality of fluid transport passageways and plurality of nozzles are adjustable and dimensioned and configured to form a plurality of geometries for directing pressurized fluid to a trailer.

20 Claims, 3 Drawing Sheets

TRAILER WASHDOWN APPARATUS

CROSS REFERENCES TO RELATED APPLICATIONS

The following application claims priority under 35 U.S.C. § 119 (e) to U.S. Provisional Patent Application Ser. No. 63/363,340 filed Apr. 21, 2022 entitled TRAILER WASHDOWN APPARATUS. The above-identified application is incorporated herein by reference in its entirety for all purposes.

TECHNICAL FIELD

The present disclosure generally relates to a trailer washdown apparatus; and, more particularly, a trailer washdown system having a plurality of adjustable fluid transport passageways for directing pressurized fluid to a trailer, a geometric storage tank, and a power arrangement for advancing fluid under pressure onto a trailer during use.

BACKGROUND

Boat trailers are used for transportation of a boat to and from boating destinations. During the loading and unloading of a boat into a body of water, the trailers are often exposed to salt water, dirt, and grime. This occurs because the trailer is partially or fully submerged in water to facilitate boat transfer on or off the trailer. Long-term exposure of the trailer to saltwater, dirt, and grime results in possible corrosion and degradation of the trailer, which in turn may increase the likelihood of mechanical failure and, thus, reduce the life of the trailer.

Cleaning systems made for boat trailers have been created to facilitate cleaning. In the past, such systems have used a pressurized tank and rigid pipes installed on a boat trailer to direct fluid at areas of the boat trailer in need of cleaning. Although this allows for the trailer to be cleaned in one position, such a system may lack flexibility or adjustability. Even if rotation of the pipes in such a system is possible, the inflexibility of pipes leads to cleaning solution output directed only at certain areas of a boat trailer, leaving salt water and other residue behind and leading to potential corrosion in high-risk areas of the boat trailer, such as the joints and wheels. Other trailer washdown apparatuses are known in the field but rely critically on a freshwater source and/or external water source for operation. These apparatuses may not be time efficient and lack the ability to direct water to desired locations.

SUMMARY

One aspect of the present disclosure includes a washdown apparatus for a trailer. The washdown apparatus has a tank with inner and outer walls, an inlet for fluid intake, and an outlet for fluid egress. The apparatus also includes a pump removably couplable to the outlet of the tank for pressurizing the fluid. The pump has an inlet coupled to the tank and an outlet for egress of pressurized fluid. A power source is coupled to the pump. A fluid distribution system is coupled to the outlet of the pump, the fluid distribution system having a plurality of flexible fluid transport passageways, the plurality of fluid transport passageways having first and second ends. The first ends are coupled to the pump outlet and the second ends are coupled to a plurality of nozzles; wherein the plurality of fluid transport passageways and plurality of nozzles are adjustable and dimensioned and configured to form a plurality of geometries for directing pressurized fluid to a trailer.

Another aspect of the present disclosure includes a method of manufacturing a washdown apparatus for a trailer. The method includes the steps of providing a tank dimensioned and configured to be couplable to a front-end frame of a trailer, the tank having an inlet for fluid intake and an outlet for fluid egress. The next step is providing a pump having an inlet and outlet and providing a fluid distribution system comprising a plurality of flexible fluid transport passageways having first and second ends; wherein the first ends of said flexible fluid transport passageways are couplable to the pump outlet and the second ends of said flexible fluid transport passageways are coupled to a plurality of nozzles. The next step is coupling the pump inlet to the tank outlet; and coupling a fluid distribution system to the pump outlet.

DESCRIPTION OF THE DRAWINGS

The foregoing and other features and advantages of the present disclosure will become apparent to one skilled in the art to which the present disclosure relates upon consideration of the following description of the invention with reference to the accompanying drawings, wherein like reference numerals, unless otherwise described refer to like parts throughout the drawings and in which.

Figure 1:
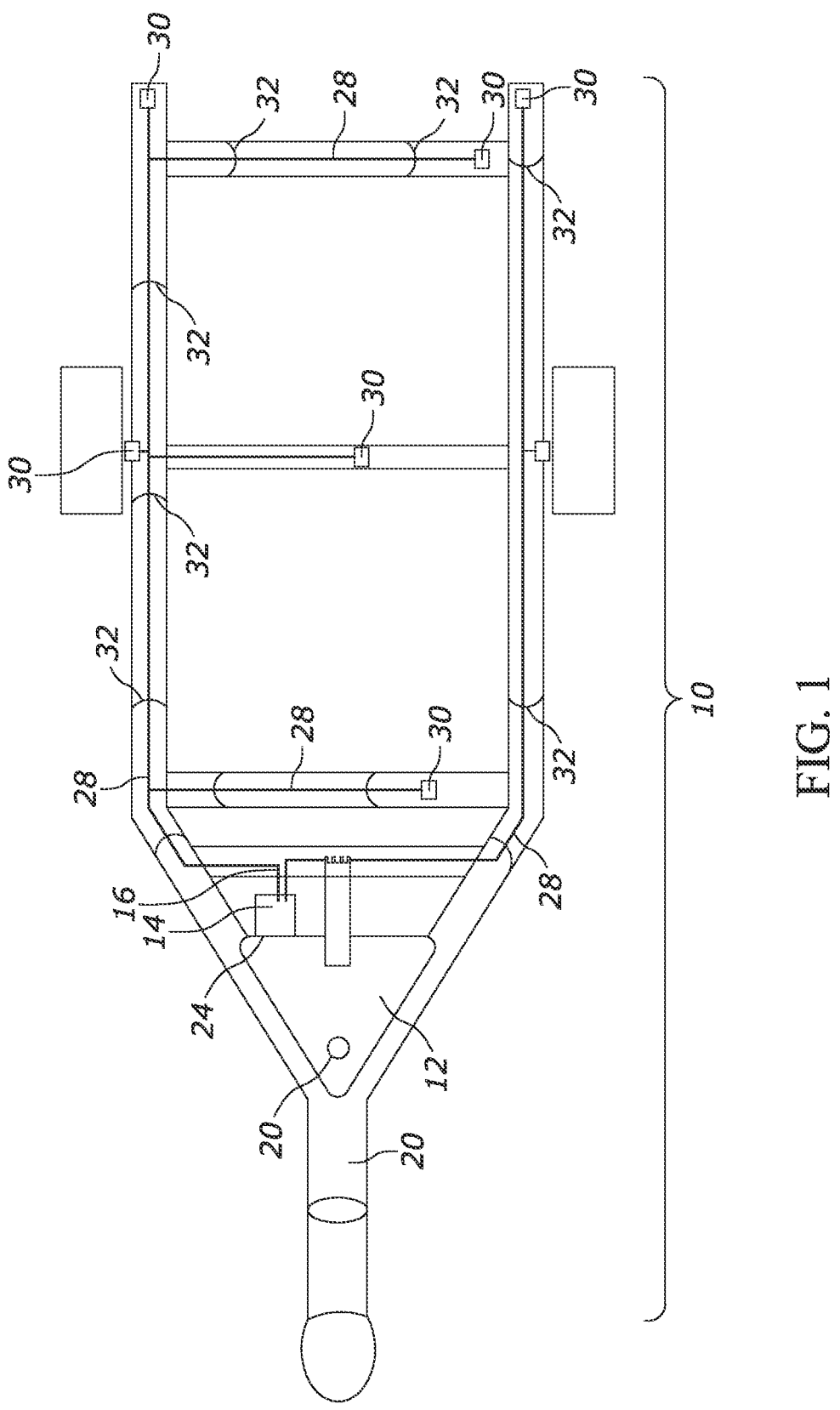
FIG. 1 is a top view of the trailer washdown apparatus on a trailer.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure. Further, the utility and purpose of many structures are shown in the figures are described throughout the specification. However, it should be appreciated that some of the structures shown in the figures have been selected or invented for aesthetic appearance and ornamental design independent of its utilitarian operation or lack thereof.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures wherein like numbered features shown therein refer to like elements throughout unless otherwise noted. The present disclosure generally relates to a trailer washdown apparatus; and, more particularly, a trailer washdown system having a plurality of adjustable fluid transport passageways for directing pressurized fluid to a trailer, a geometric storage tank, and a power arrangement and fluid distribution system for advancing fluid under pressure onto a trailer during use.

A trailer washdown apparatus 10, in accordance with one example embodiment of the present disclosure, is shown in FIG. 1. The trailer washdown apparatus 10 may be used for boat trailers that are exposed to salt water in one example embodiment. In another example embodiment, the trailer washdown apparatus 10 may be used with boat trailers exposed to fresh water.

Figure 2:
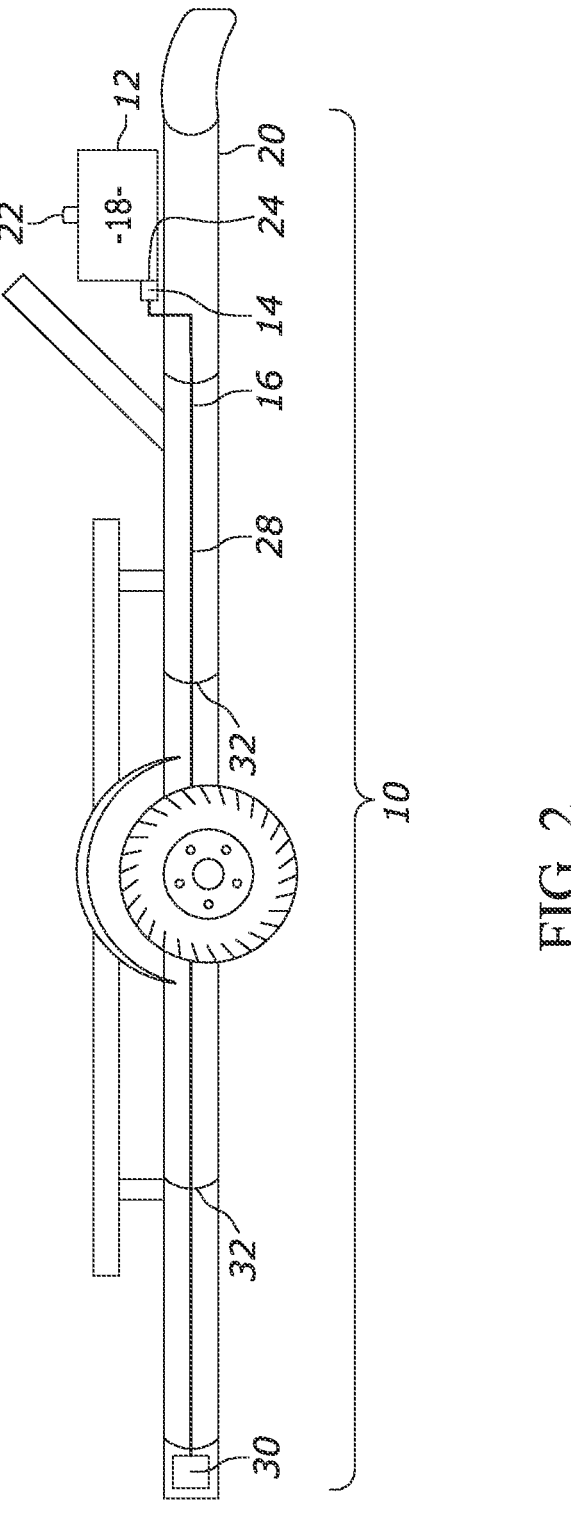
FIG. 2 is a side elevational view of the trailer washdown apparatus coupled to a trailer.

FIGS. 1 and 2 show the trailer washdown apparatus or system 10 including a fluid holding tank 12, a pump 14, and a fluid distribution system 16. The trailer washdown apparatus 10 is shown coupled to a boat trailer 20. One of ordinary skill in the art, after reviewing the present disclosure, would understand that it may be possible to use the trailer washdown apparatus 10 with other types of transport vehicles. For example, in the illustrated example embodiment, the trailer 20 includes only a single axle, but it would be appreciated by one of ordinary skill in the art with the benefit of this disclosure and drawings that two or more axles could be used and benefit from the system described and shown herein.

In one example embodiment of the present disclosure, the tank 12 has inner (not shown) and outer walls 18 that define a volume of the tank 12. In this example embodiment, the outer walls 18 are dimensioned and configured to fit onto and be coupled to a front end of the boat trailer 20 so that the shape of the tank 12 closely matches the shape of the front end of the boat trailer 20. This configuration for the tank 12 is geometrical by design allowing the washdown apparatus 10 to easily fit onto and be supportable by the front end of a boat trailer. The geometrical tank 12 in the illustrated example embodiment contains only three side walls, thus forming a triangle, maximizing the turning radius and angles of the trailer when being advanced and steered in a reverse direction, often used when unloading a boat to water from an unloading dock. Stated another way, the geometrical tank 12, forming a triangle is protected by the trailer from contact and/or engagement resulting in fracturing of the tank by the pulling vehicle if the tank projected beyond the trailer frame.

Moreover, the geometrical tank 12 configuration allows for it to be positioned at the foremost position of the trailer 20. This advantageously allows the tank to add to the tongue weight of the trailer when the boat is traditionally the heaviest on the way to the destination and then advantageously empty and light when less tongue weight is needed on the return from the destination, because the fluid is emptied because of washing of the trailer once the boat is removed from the water. In other example embodiments, the tank 12 is located on a side, back, or bottom of the boat trailer 20.

Within the geometrical storage tank 12 is washing fluid (with for example, a soap additive, desalination fluid, fresh water, potable water, salt-away, rust inhibitors, or the like, hereinafter collectively or individually "fluid" or "washing fluid") that may be pressurized by a pressure arrangement comprising the pump 14 powered by a portable battery located on the trailer. In one example embodiment, the pump is encased with a rechargeable battery or mounted with a battery adapter. In another example embodiment, the power supply is from the battery of the tow vehicle in an adapter that is typically used for lighting on the trailer.

The pressure arrangement is then used for washing and cleaning the boat trailer 20 from salt, slime, debris and the like. In one example embodiment, the geometrical tank 12 is relatively light in weight in order to be portable and movable by a single user, in order to facilitate potential movement from one trailer 20 to another trailer 20 of equal or different size.

The geometrical tank 12 has an inlet 22 for receiving fluid and an outlet 24 for fluid egress. The fluid may be fresh water or another solution that is intended to aid in preventing the boat trailer 20 from corroding, rusting, losing paint, compromising moving parts or bearings, and the like. The pump 14 is coupled to the outlet 24 of the geometrical tank 12. The pump 14 is positioned at the outlet 24 and pressurizes the fluid after the fluid exits the tank 12 through a manifold of tubes directed about the frame of the trailer as indicated by the figures.

This order of components eliminates the need for the tank 12 itself to be pressurized for the washdown apparatus 10 to operate. The geometrical tank 12 not needing to be pressurized allows for the tank to be constructed from a relatively lightweight material to be used, which advantageously reduces the weight, retail cost, and production cost of the washdown apparatus 10. In one example embodiment, the pump 14 is a pump made by Seaflo under part number 23, which is a diaphragm pump. In another example embodiment, the pump 14 has a flow rate between 1.0 and 2.0 gallons per minute (GPM), and preferably approximately 1.5 GPM at a pressure between 50 and 150 pounds per square inch (PSI), and preferably approximately 120 PSI. In one example embodiment, the pump 14 includes a protective housing, and can be removed from the system without removing it from the trailer 20.

Figure 3:
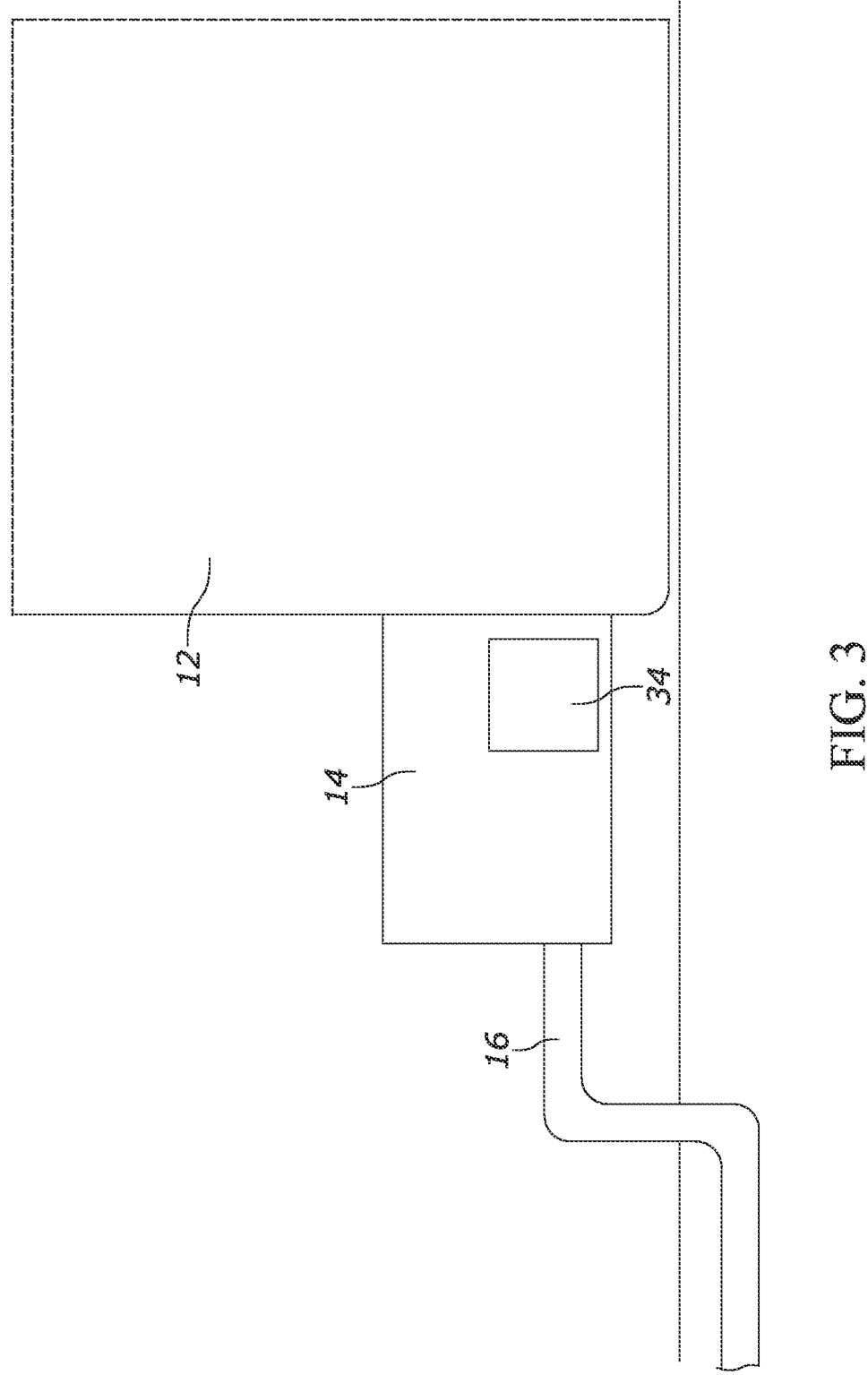
FIG. 3 is a magnified view of FIG. 2 showing the coupling between the pump, tank, and fluid distribution system.

As shown in FIG. 3, the pump 14 is configured so that the inlet of the pump 14 is connected to the outlet 24 of the tank 12 and the outlet of the pump 14 is connected to the inlet of the fluid distributing system or manifold 16. The pump 14 can pressurize the fluid such that it will effectively washdown the boat trailer 20 after exiting the fluid distributing system 16.

The fluid distributing system 28 is connected to an outlet of the pump 14 and has a plurality of fluid transport passageways 28. In one example embodiment of the present disclosure, the fluid transport passageways 28 comprise flexible hoses. The plurality of flexible hoses 28 have first and second ends, the first ends being coupled to the pump outlet and the second ends being coupled to a plurality of nozzles 30. In one example embodiment, the nozzles 30 are corrosion resistant made of brass, plastic, or any combination thereof and comprise a barb for attaching to a T-connector or an end of one of the flexible hoses 28. In another example embodiment, the nozzles 30 include an adjustable end to adjust the spray pattern from concentrated to a wide pattern at the desired angle at the trailer. The nozzles 30 are attached to the frame by connectors such as brackets, tie-wraps, L-brackets, and the like. In yet another embodiment, the nozzles 30 include a ball type nozzle to allow further adjustment of the spray angle from the bracket or frame.

The plurality of flexible hoses 28 and the plurality of nozzles 30 allows the system to be adjusted and re-adjusted into user-preferred geometries for directing pressurized fluid to preferred areas of the boat trailer 20. Advantageously, the multitude of possible geometries allows for the fluid distribution system 16 to clean the boat trailer 20 at any angle needed to remove any salt, grime, and/or debris. The flexible hoses 28 also advantageously allow for the trailer washdown apparatus 10 to fit onto different sizes and shapes of boat trailers without the addition of structural manipulation. In one example embodiment, the flexible hose 28 is PVC braided vinyl tubing. In another example, the flexible hose 28 is polyvinyl chloride, rubber, or a polymer. In another example embodiment, the flexible hose 28 is ⅝ of one inch diameter accommodating ¼ of one inch diameter fittings and T-connectors to divide the flow paths of the hose 28. The step down size in diameter of the T-connectors and exhaust nozzles allows an increase in pressure to the spray nozzles as well as adequate flow for washing the trailer 20.

In one example embodiment, the fluid distribution system 16 is secured to the boat trailer 20 by position assists 32. In one example embodiment, the position assists 32 comprise removable fittings. The removable fittings 32 are positioned along the boat trailer 20 such that the flexible hoses 28 may follow the shape of the frame of the boat trailer 20. The plurality of nozzles 30 direct the pressurized fluid as it exits the fluid distribution system 16. The nozzles 30 can be directed towards a plurality of desired locations on the boat trailer 20. The removable fittings 32 allow for the nozzles 30 to be arranged in a plurality of desired configurations on the boat trailer 20.

In an alternate embodiment, the position assists 32 that secure the fluid distribution system 16 may be non-removable, creating a more secure connection to the boat trailer 20. An additional feature of one embodiment is that the flexible hoses 28 include excess length of hose that may later serve to allow the nozzles 30 to be adjusted to a position that may require a longer length of hose than what was required when initially installed. Stated another way, the flexible hoses 28 comprise a length that exceeds that of a first measured boat trailer 20 length. Additionally, the feature of excess flexible hose 28 length may allow for the washdown apparatus 10 to be attached to multiple boat trailer 20 sizes.

Referring now to FIG. 3, a power source 34 is attached to the pump 14. In one example embodiment, the power source 34 comprises a battery. The battery 34 provides power to the pump 14. The battery 34 may be located anywhere on the trailer washdown apparatus 10 or boat trailer 20 as long as it is operatively coupled to the pump 14. In an alternate embodiment, power source 34 is an external power source for the pump 14.

The washdown apparatus 10 can be made of any suitable material, such as metal or plastic. Preferably, the tank 12 is constructed through blow molding. However, other methods for manufacturing, including, but not limited to, casting may also be used. Welding, adhesives, or fasteners may also be for attaching features together.

To use the trailer washdown apparatus 10, a user starts by installing the apparatus 10 on a trailer 20. As shown in FIG. 1 and explained above, a tank 12 is installed on the front of the trailer 20, with a pump 14 connected to the outlet 24 of the tank 12. The pump 14 is positioned at the outlet 24 for pressurizing the fluid after the fluid exits the tank 12. A power source, such as a direct current battery 34, is attached to the pump 14. Finally, a fluid distributing system 16 is coupled to an outlet of the pump 14. The fluid distribution system 16 has plurality of flexible hoses 28 and a plurality of nozzles 30. To install the hoses on the trailer 20, the hoses 28 may be secured with position assists 32 at preferred locations. Then, the plurality of flexible hoses 28 and, thus, coupled nozzles 30 may be adjusted and re-adjusted into preferred geometries for directing pressurized fluid to preferred areas of the boat trailer 20. The next step is for a user to fill the tank 12 of the washdown apparatus 10 with a fluid such as cleaning solution. The cleaning solution can be fresh water, or a combination of fresh water and cleaning chemicals.

A user may engage the trailer washdown apparatus 10 after submerging the trailer 20 in a body of fresh or salt water. The trailer washdown apparatus 10 may be used to clean the trailer after partial or full submersion of the trailer 20 depending on the depth of the body of water at the boat landing. After the trailer has been removed from the body of water, the next step is energizing the pump 14 by means of a conventional switch, not shown, on the washdown apparatus 10. The final steps are transporting the trailer to a temporary location and de-energizing the pump 14 on the trailer washdown apparatus 10 once the trailer 20 is parked.

Those of ordinary skill in the art will conceive of other alternate embodiments of the invention upon reviewing this disclosure. Thus, the invention is not to be limited to the above description but is to be determined in scope by the claims which follow.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%.

The term "coupled" as used herein is defined as connected or in contact either temporarily or permanently, although not necessarily directly and not necessarily mechanically. A device or structure that is "configured" in a certain way is configured in at least that way, but may also be configured in ways that are not listed. The term "integral" as used herein unless defined otherwise means configured in such a way that separation would require destruction to the parts or the assembly of the parts.

It should be appreciated by those of ordinary skill in the art after having the opportunity of reviewing the drawings and/or specification of the present disclosure that it may include one or more embodiments, e.g., E1, E2, . . . . En and that each embodiment E may have multiple parts A1, B1, C1 . . . . Zn that (without further description) could be combined with other embodiments En, embodiment parts e.g. A1, C1, or lack of parts originally associated with one or all embodiments En, or any combination of parts and/or embodiments thereof. It should further be appreciated that an embodiment En may include only one part e.g. A1 or a lesser number of parts e.g. B1, C1 of any embodiment or combination of embodiments that was described or shown in the specification and/or drawings, respectively in ways not enumerated or illustrated.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A washdown apparatus for a trailer, the washdown apparatus comprising:

a triangular tank comprising three side walls coupled to and spacing a top wall from a bottom wall; said triangular tank further comprising an inlet for fluid intake and an outlet for fluid egress;

a pump removably coupled to the outlet of the triangular tank for pressurizing the fluid, the pump having an outlet for egress of pressurized fluid;

a power source electrically coupled to said pump;

a fluid distribution system coupled to the outlet of the pump, the fluid distribution system having a plurality of flexible fluid transport passageways, the plurality of fluid transport passageways having first and second ends, wherein the first ends are coupled to the pump outlet and the second ends are coupled to a plurality of nozzles; wherein the plurality of fluid transport passageways and plurality of nozzles are adjustable and dimensioned and configured to form a plurality of geometries for directing pressurized fluid to a trailer; and wherein the fluid transport passageways are dimensioned and configured to comprise a length greater than that of a first measured trailer length; wherein the fluid transport passageways configured to comprise a length that exceeds that of the first measured trailer length may allow for the washdown apparatus to be attached to multiple trailer sizes.

2. The trailer washdown apparatus of claim 1, wherein the power source comprises a battery.

3. The trailer washdown apparatus of claim 1, wherein the outer walls of the triangular tank are dimensioned and configured to be coupled with a frame of a boat trailer.

4. The trailer washdown apparatus of claim 1, wherein the apparatus further comprises a plurality of position assists for angling the plurality of flexible fluid transport passageways and plurality of nozzles coupled thereto.

5. The trailer washdown apparatus of claim 4, wherein the triangular tank is at atmospheric pressure during use and said pump is in fluid communication with said outlet of said triangular tank.

6. The trailer washdown apparatus of claim 1, wherein the triangular tank is positioned at the foremost position of the trailer.

7. The trailer washdown apparatus of claim 3, wherein the triangular tank is geometrical consisting of three sides to be configured to be coupled with a front end of a boat trailer during use so that the shape of the triangular tank closely matches the shape of the front end of the boat trailer.

8. The trailer washdown apparatus of claim 3, wherein the triangular tank is dimensioned and configured to be coupled with a back end of said boat trailer.

9. A method of manufacturing a washdown apparatus for a boat trailer, the method comprising the steps of:

providing a tank dimensioned and configured to be couplable to a frame of a boat trailer, the tank having an inlet for fluid intake and an outlet for fluid egress;

providing a pump having an inlet and an outlet;

providing a fluid distribution system comprising a plurality of flexible fluid transport passageways having first and second ends; wherein the first ends of said flexible fluid transport passageways are couplable to the pump outlet and the second ends of said flexible fluid transport passageways are coupled to a plurality of nozzles;

wherein the plurality of flexible fluid transport passageways are manufactured to be adjustable and re-adjustable into selectable geometries for directing pressurized fluid to desirable areas of the boat trailers frame and moving parts;

wherein the fluid transport passageways are dimensioned and configured to comprise a length greater than that of a first measure trailer length: wherein the fluid transport passagways configured to comprise a length that exceeds that of the first measure trailer length may allow for the washdown apparatus to be attached to multiple trailer sizes;

coupling the pump inlet to the tank outlet; and coupling a fluid distribution system to the pump outlet.

10. The method of manufacturing a washdown apparatus for a boat trailer of claim 9 further comprising the step of providing a plurality of position assists along the flexible fluid transport passageways.

11. The method of manufacturing a washdown apparatus for a boat trailer of claim 10 further comprising the step of statically coupling said position assists to said flexible fluid transport passageways.

12. A washdown system for a trailer, the washdown system comprising:

a tank comprising three side walls coupled to and spacing a top wall from a bottom wall;

said tank further comprising an inlet for fluid intake and an outlet for fluid egress;

a tank coupling for coupling the tank to a front-end frame of a boat trailer;

a pump removably coupled to the outlet of the tank for pressurizing the fluid, the pump having an outlet for egress of pressurized fluid;

a power source; and a fluid distribution system coupled to the outlet of the pump, the fluid distribution system having a plurality of fluid transport hoses, the plurality of fluid transport hoses having first and second ends, wherein the first ends are coupled to the pump outlet and the second ends are coupled to a plurality of nozzles; wherein the plurality of fluid transport passageways and plurality of nozzles are adjustable and dimensioned and configured to form a plurality of geometries through a plurality of position assists for directing pressurized fluid to a trailer.

13. The trailer washdown apparatus of claim 12, wherein the tank is formed in a triangular shape.

14. The trailer washdown apparatus of claim 12, wherein the plurality of position assists comprise removable fittings for attaching the trailer washdown apparatus to a trailer.

15. The trailer washdown apparatus of claim 12, wherein the plurality of hoses are dimensioned and configured to comprise a length greater than that of a first measured trailer length.

16. The trailer washdown apparatus of claim 12, wherein the tank is confined within the front frame of said trailer, for increasing the turn radius of said trailer during use.

17. The trailer washdown apparatus of claim 12, wherein the tank coupling comprises a coupling frame dimensioned and configured to be coupled to the front end of the boat trailer.

18. The trailer washdown apparatus of claim 12, wherein the plurality of position assists are removably couplable with the fluid distribution system.

19. The trailer washdown apparatus of claim 12, wherein the plurality of position assists is fixed in a set location with the fluid distribution system.

20. The trailer washdown apparatus of claim 1, wherein the nozzles include an adjustable end to adjust the spray pattern from concentrated to a wide pattern at the desired angle at the trailer.

* * * * *